(12) United States Patent
Tsinman et al.

(10) Patent No.: US 7,028,624 B2
(45) Date of Patent: Apr. 18, 2006

(54) METHOD AND APPARATUS FOR THE TREATMENT OF DOMESTIC WASTE

(75) Inventors: Yakov Tsinman, Arad (IL); Jean-Claude Ohayon, Beersheva (IL)

(73) Assignee: T.G.E. Tech Ltd., Arava (IL)

( * ) Notice: Subject to any disclaimer, the term of this patent is extended or adjusted under 35 U.S.C. 154(b) by 0 days.

(21) Appl. No.: 10/485,292

(22) PCT Filed: Aug. 1, 2002

(86) PCT No.: PCT/IL02/00631

§ 371 (c)(1), (2), (4) Date: May 25, 2004

(87) PCT Pub. No.: WO03/012013

PCT Pub. Date: Feb. 13, 2003

(65) Prior Publication Data

US 2004/0206280 A1  Oct. 21, 2004

(30) Foreign Application Priority Data

Aug. 2, 2001 (IL) .................. 144718

(51) Int. Cl.
- F23B 7/00 (2006.01)
- F23G 5/02 (2006.01)
- F23K 3/00 (2006.01)

(52) U.S. Cl. .............. 110/341; 110/229; 110/223; 110/315; 110/101 R

(58) Field of Classification Search .......... 110/229, 110/223, 315, 101 R, 185, 186, 187, 188, 110/341

See application file for complete search history.

(56) References Cited

U.S. PATENT DOCUMENTS 2,311,140 A  2/1943  Daniels

FOREIGN PATENT DOCUMENTS

| EP | 0136277 | 4/1985 |
| JP | 07324432 | 12/1995 |
| JP | 10153892 | 11/1998 |
| WO | WO 96/00267 | 1/1996 |

(Continued)

OTHER PUBLICATIONS

PCT Notification of Transmittal of IPER—one page, mailed Mar. 4, 2004—for corresponding PCT appl. of this application.

(Continued)

*Primary Examiner*—Kenneth Rinehart
(74) *Attorney, Agent, or Firm*—Roach Brown McCarthy & Gruber P.C.; Kevin D. McCarthy

(57) ABSTRACT

Method of treatment of domestic waste. A reaction space is provided, into which the waste to be treated is fed at a controlled rate. The waste is concurrently compacted to form a stopper preventing leakage of gases from the reaction space. An oxygen-containing gas is fed to the reaction space, in order to affect the combustion of the waste and produce gases and solid material. The gas is filtered through the solid material, causing the gases to react with the solid material, whereby to produce fuel gases and ash.

17 Claims, 9 Drawing Sheets

U.S. PATENT DOCUMENTS

| | | | | |
|---|---|---|---|---|
| 4,553,285 A | * | 11/1985 | Sachs et al. | 110/223 |
| 4,732,092 A | * | 3/1988 | Gould | 110/229 |
| 4,883,499 A | | 11/1989 | Beierle | |
| RE34,298 E | * | 6/1993 | Gitman et al. | 431/5 |
| 5,544,597 A | * | 8/1996 | Camacho | 110/223 |

FOREIGN PATENT DOCUMENTS

| | | |
|---|---|---|
| WO | WO 99/34662 | 7/1999 |
| WO | WO 99/37738 | 7/1999 |
| WO | WO 99/42540 | 8/1999 |
| WO | WO 01/83645 | 11/2001 |

OTHER PUBLICATIONS

PCT IPER—13 pages, mailed Mar. 4, 2004—for corresponding PCT appl. of this application.

International search report for PCT/IL02/00631, mailed Jan. 28, 2003.

* cited by examiner

METHOD AND APPARATUS FOR THE TREATMENT OF DOMESTIC WASTE

FIELD OF THE INVENTION

This invention relates to a method and apparatus for the treatment of domestic waste, for the purpose of disposing of it in an ecologically sound manner and producing from it combustible gases, particularly carbon monoxide and hydrogen.

BACKGROUND OF THE INVENTION

The ecological disposal of domestic waste and the production of useful products, specifically combustion gases from it, form the subject matter of a number of proposals in the prior art.

Domestic waste is usually treated after having been accumulated as municipal waste. Its composition is highly variable. It is often referred to as "biomass", since it contains a considerable proportion of food residues, but in reality it is only partially a biomass. It may, and frequently does, also contain considerable amounts of cardboard and paper and generally cellulosic material or partly cellulosic material such as wood. It also does contain inorganic materials, such as metal or glass or even rocks or sand, and other materials such as plastics, fabrics, and so on. As a result, part of the waste can produce combustible gases and an oxidation residue and part remains substantially unchanged, so that, at the end of any disposal and utilization process, a substantially inorganic ash is produced. All possible compositions of domestic waste can be treated by the method and apparatus of this invention, which is therefore not limited to any range of compositions and the term "domestic waste" is intended herein to include all compositions, but of course the parameters of the process must be controlled to take into consideration the composition being treated. This, however, comes within the capabilities of skilled persons and requires no particular description, although some indication will be given later.

EP-A 136 277 A2 discloses an apparatus and method for gasifying what is called "biomass fuels". A mass refractory layer has a first inclined fuel supporting ramp. A mass of refractory is provided opposing surface to define a primary gasification chamber. The chamber is sealed by another mass of refractory. Biomass fluid, heated by radiation from the refractory, carbonizes and releases volatile gases. Additionally, the apparatus comprises a lower refractory layer having a second inclined ramp, which has a plurality of inlet holes to provide air distribution in a specific combustion zone located below the zone in which carbonization occurs.

WO 96/00267 discloses a process in which waste is charged into a reactor, an oxygen-containing gas is injected into it, solid products and gaseous products produced by the treatment are withdrawn, and the treatment results from the successive passage of the waste through a heating and drying zone, a thermolysis zone, an oxidation zone and a cooling zone. In this application the control of the temperature to maintain it between 700 and 1400° C. is effected by controlling at least one of the parameters among the oxygen mass fraction and the mass fractions of the incombustible and the combustible components of the waste.

WO 99/37738 (some of the inventors thereof are the same as those of the preceding application) discloses a method of processing municipal wastes, primarily highly humid ones, which comprises drying, pyrolyzing and gasifying the waste by means of an oxygen-containing gas, at temperatures between 800 and 1300° C., by controlling the same parameters as are controlled in WO 96/00267, with the feature that the smoke gas, preferably a mixture with air, is used as the gasifying agent and the mass fractions of oxygen in said agent and of incombustible and combustible components in the waste satisfy a certain quantitative condition.

WO 99/42540 discloses a process for the gasification of biomass or biomass-comprising materials, which gasification takes place in a reverse-flow reactor in which the line of direction in which gas is passed through the biomass cuts the line of direction in which the biomass is supplied.

Japanese Application No. 07324432 discloses a burner for municipal refuse, wherein the temperature of the burning space of the burner chamber is raised to about 2000° C., then air is supplied and the temperature of the uppermost layer of a fuel packed bed is raised.

Japanese Application No. 10153892 discloses a gasification furnace for municipal waste divided by a partition plate into a first-stage gasification chamber for pre-heating and drying and a second-stage gasification chamber for obtaining partly oxidized gas.

The aforesaid and other prior art patents are not satisfactory for an efficient treatment of municipal wastes, for various reasons. Some of them do not permit continuous operation, or, if they permit it, it is very difficult to control it. The efficiency of their processes is limited. The structure and the operation of the reactors are complicated and expensive. Gas leakage problems are not considered, or if considered, are not adequately solved. The waste must be sorted according to composition and dimensions of particles before recycling.

This invention therefore has the purpose of providing a method and apparatus for the disposal of domestic wastes and the production of fuel gas from it that are free of the defects of the prior art methods and apparatus.

Another purpose of the invention is to provide such a method and apparatus that are adapted to continuous production.

A further purpose is to provide such method and apparatus that permit control of the feed of waste and of the rate of production in a full and adequate manner.

A still further purpose is to provide such a method and apparatus that are reliable in operation.

A still further purpose is to provide such a method and apparatus that are simple and economically convenient.

A still further purpose is to provide such a method and apparatus that prepares insert and metal materials for use.

Other purposes and advantages of the invention will appear as the description proceeds.

SUMMARY OF THE INVENTION

The method of the invention comprises;

a) providing a reaction space including a first, incomplete combustion zone, and a second, gasification zone;

b) feeding the waste to be treated to said reaction space at a controlled rate;

c) concurrently compacting said waste to form a stopper preventing leakage of gases from said reaction space;

d) feeding an oxygen-containing gas, preferably air, at a high temperature and under pressure to said incomplete combustion zone, whereby to effect incomplete combustion n of said waste; and e) filtering the gases produced by said incomplete combustion through the solid material in the gasification zone, whereby to produce carbon monoxide and hydrogen.

In the incomplete combustion zone, besides the incomplete combustion of the waste, other phenomena may occur, including drying of the waste, evaporation of the water contained therein, and combustion of gases produced by the combustion of the waste.

The incomplete combustion of the waste will be called hereinafter "thermolysis" and the incomplete combustion zone will be called hereinafter "thermolysis zone". In said zone there are produced carbon dioxide and a carbon-containing solid residue. The carbon contained in said residue reacts with carbon dioxide and water according to the well known reactions $CO_2+C=2CO$ and $H_2O+C=H_2+CO$.

The method of the invention also includes disposing of the ash that is the final product of the gasification. It may also include controlling the temperature in various parts of the reaction space by controlling the temperature of the oxygen-containing gas fed thereto, controlling the rate of feed of the waste and the resulting ratio of the waste feed to the oxygen-containing gas feed, and thermally insulating the reaction space. All the amounts of materials will be expressed herein as weight, unless otherwise specified. Persons skilled in the art may carry out other temperature-controlling operations that are conventional in themselves. Since the oxygen-containing gas is generally air, hereinafter reference will be made only to air for purposes of description, but this does not involve any limitation of the invention.

The regulation of the process is a function of the composition of the gas produced (e.g., according to the equilibrium constant) and the temperature of the reaction space. The regulation is effected by changing the waste feed rate and the amount of air supplied.

The invention further comprises an apparatus which includes:

A. a reaction chamber, which comprises a thermolysis zone and a gasification zone;

B. a feed vessel, hereinafter called "hopper"—in which term every possible shape and structure thereof is intended to be included—into which the waste to be processed is loaded;

C. waste feed means for advancing the waste from said hopper to said reaction chamber at a controlled rate and for compacting it concurrently;

D. at least two conduits for the waste advanced by said hopper, set at an angle—preferably a right angle—to one another;

E. an air chamber in communication with said reaction chamber;

F. a gas-receiving chamber for receiving the gases produced in the gasification zone of said reaction chamber, provided with an outlet for said gases; and G. means for discharging the ash formed in said gasification chamber.

In a number of embodiments, the apparatus further comprises a cooling jacket surrounding the upper portion of said reaction chamber, while the gas-receiving chamber surrounds the lower portion of said reaction chamber. In another embodiment, the air chamber and the gas receiving chamber together surround the reaction chamber.

The waste feed means for advancing the waste from said hopper to said reaction chamber at a controlled rate and for compacting it concurrently, preferably consist of two pistons, coupled to two waste conduits. Since said conduits are at an angle to one another, generally at a right angle, the waste advanced by the first piston will reach the end of the first conduit and be stopped by the wall of the second conduit, whereby to form a stopper due to the pressure exerted by the first piston, said stopper being later advanced by the second piston into the said second conduit until it is discharged into the reaction chamber. The two pistons will be synchronized to carry out this operation, as will be explained hereinafter. While the aforesaid structure of the waste feed means is preferred, it is not limiting, and other mechanical arrangements can be devised by skilled persons within the scope of the invention The apparatus of the invention further comprises, or is associated with, means for feeding the air under pressure to the air chamber. That pressure drives the gases throughout the apparatus, and particularly drives the combustion gases through the solid residue caused by the thermolysis of the waste.

The means for discharging the ash may be of any convenient mechanical structure, but preferably are similar to the aforesaid feed means, and comprise a piston, a conduit for the ash advanced by the piston, and an outlet.

DETAILED DESCRIPTION OF PREFERRED EMBODIMENTS

Figure 1:
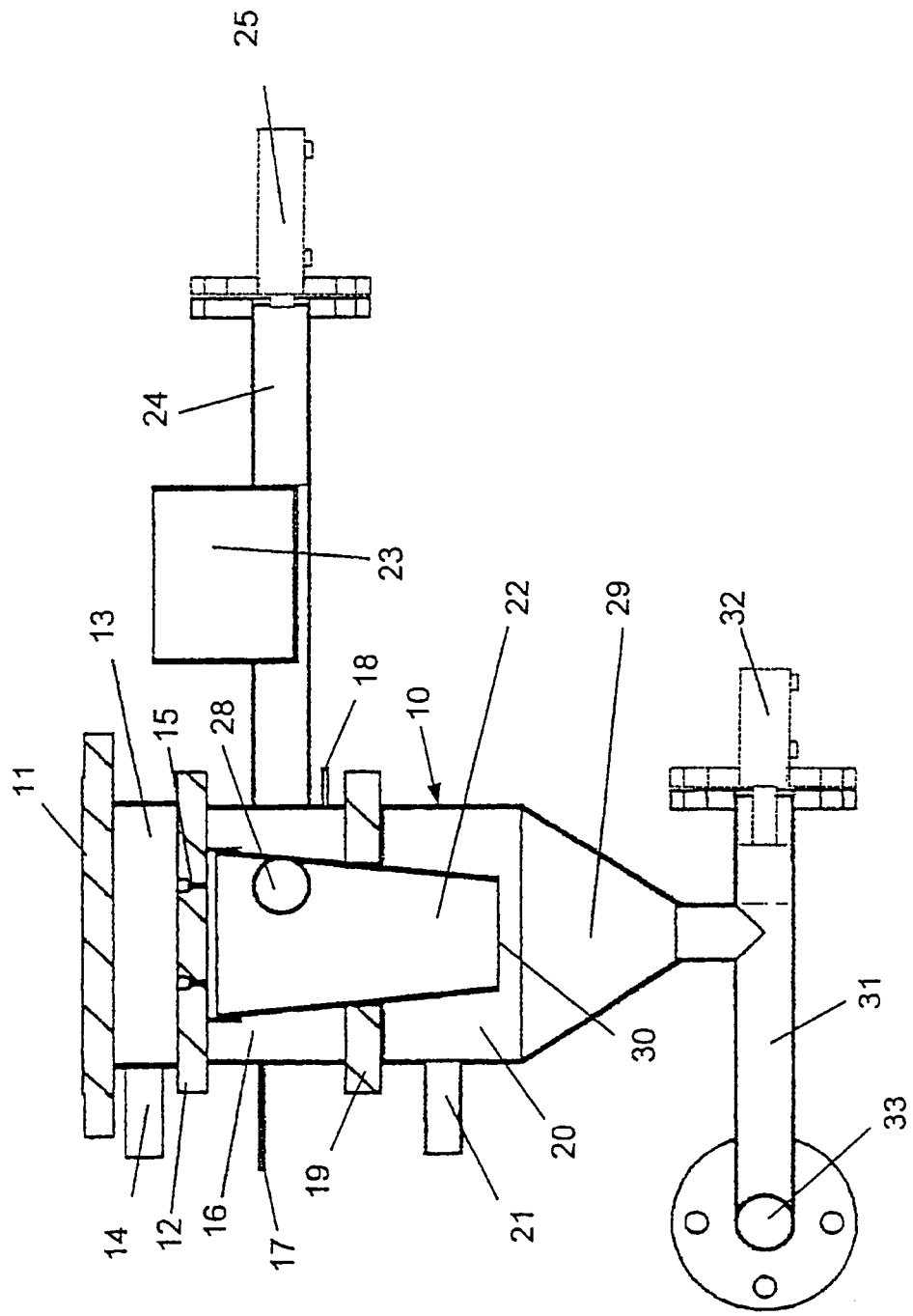
FIG. 1 is a schematic vertical cross-section of the apparatus according to an embodiment of the invention, taken on the plan passing through the axis of the reaction chamber.
Figure 2:
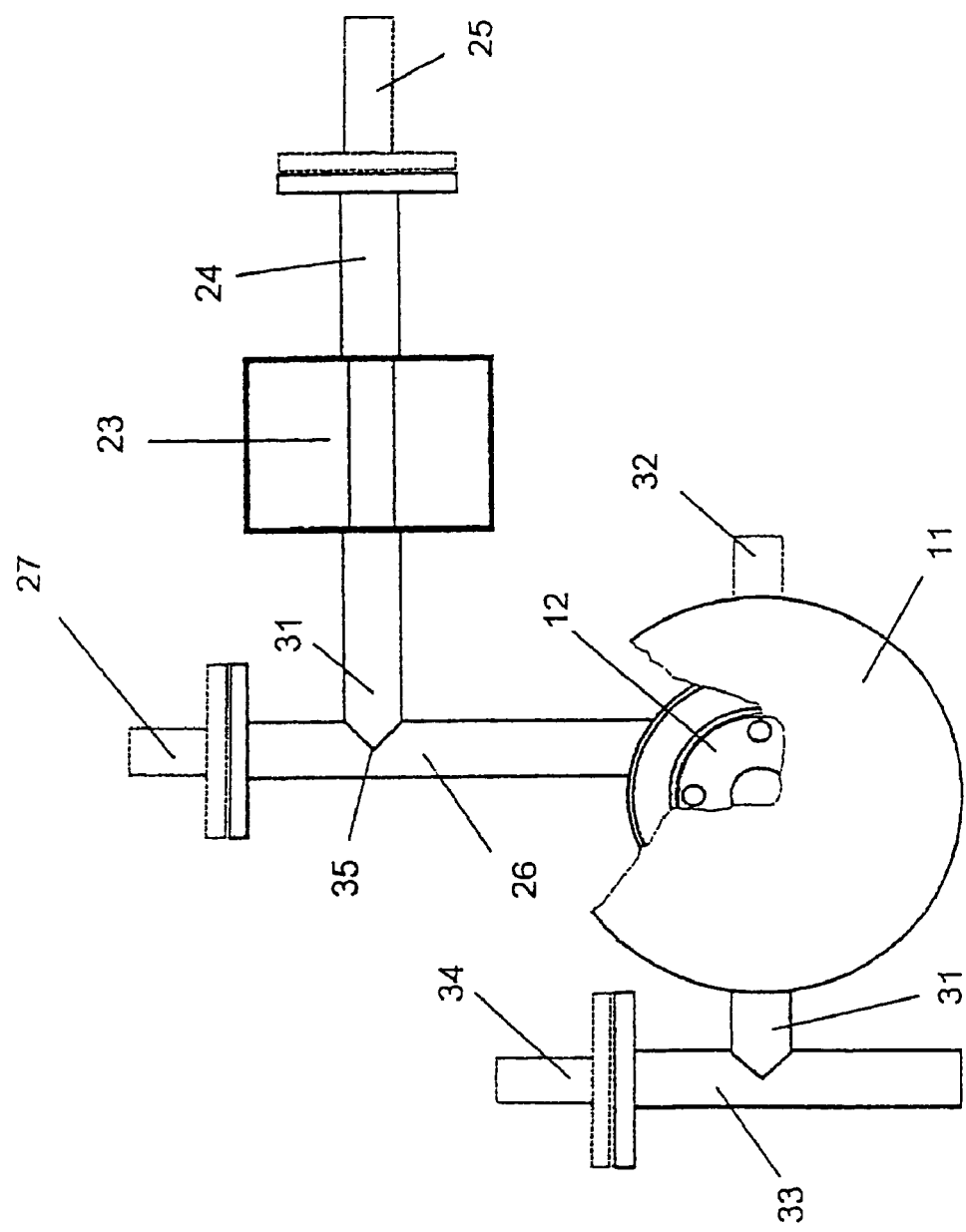
FIG. 2 is a schematic view of the apparatus of FIG. 1 from above, portions of the top plate thereof broken off to show the underlying parts.

With reference now to FIGS. 1 and 2, numeral 10 generally indicates the outer wall of the cooling and the gas-receiving chambers. The apparatus also comprises a top plate 11 and a partition plate 12 which define the air chamber 13, said air chamber being provided with an inlet 14 for the hot air. Apertures 15, which in this embodiment are generally hopper-shaped, having a broader upper portion and a narrower low portion, provide communication between said air chamber 13 and a cooling jacket 16 in which cooling air is circulated through outlet 17 and inlet 18. The cooling of the thermolysis zone is especially necessary at the moment of heating, because highly energetic fuel burns at temperatures of 1200° C. and higher. Since when the operation of the apparatus starts, the waste to be treated must be heated from the outside until a correct operating temperature, preferably not more than 100° C., is reached, a hot gas may be temporarily circulated through jacket 16 instead of cooling air, or electrical or jacket means may be so temporarily employed.

A partition 19 separates cooling jacket 16 from a gas receiving chamber 20 provided with outlet 21. A reaction chamber 22 is located below plate 12 and centrally of cooling jacket 16 and of gas receiving chamber 20. The upper part of said reaction chamber is a thermolysis zone and the lower part is a gasification zone, but it should be understood that no precise border between said two zones exists or can be established. Actually, during the operation of the apparatus, the zone in which thermolysis ends and gasification begins may shift towards the top or the bottom.

The means for feeding the waste to be treated to the reaction chamber comprise a hopper 23 for receiving the waste 29. Hopper 23 is coupled to a first conduit 24 (see FIGS. 3A, B and C) and discharges the waste into it. A piston 25, only schematically indicated in FIGS. 1 and 2, is shown in three successive positions indicated as 25a, 25b and 25C in FIGS. 3A, B and C. Piston 25 is initially in inactive position 25a, but advances to position 25b in conduit 24 when waste 38 has been discharged into conduit 24. It is then advanced to position 25c, below hopper 23 (see FIG. 3B), thus driving the waste along conduit 24 towards a second conduit 26 disposed at right angle to conduit 24. As the waste reaches the junction 35 of the two conduits (see FIG. 2) its progress parallel to conduit 24 is stopped by the wall of conduit 26 and the waste is compacted there and forms a stopper 36. A piston 27, only schematically shown in FIG. 2, is shown in two successive positions indicated as 27a and 27b in FIGS. 3A, B and C. Piston 27 is initially in inactive position 27a higher than conduit 24 (see FIG. 3B), but advances to position 27b in conduit 26 (see FIGS. 3A and C) after waste 38 has been compacted into conduit 26 to form stopper 36. In so doing, it drives said compacted waste— said stopper—along conduit 26 until it reaches opening 28 (see FIGS. 1 and 4), viz. the outlet of conduit 26 in the reaction chamber 22. Concurrently, piston 25 retracts to position 25b, to permit further waste to be discharged from hopper 23 into conduit 24 (see FIGS. 3A and C).

Figure 3A:
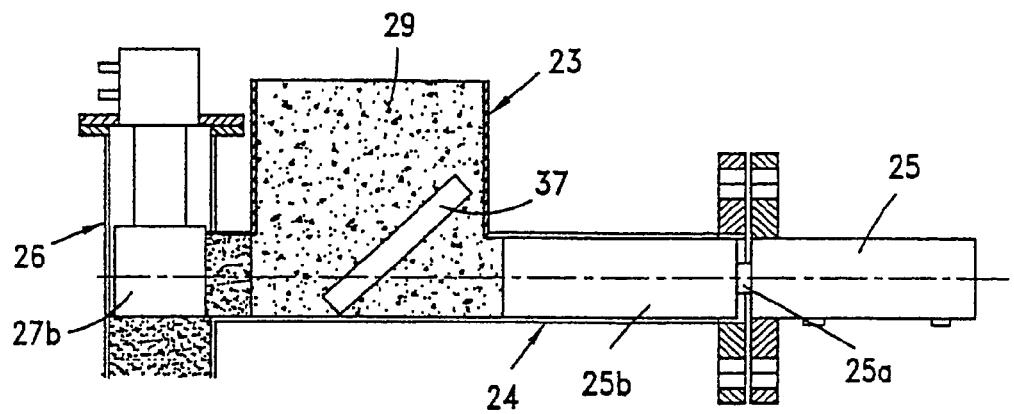
FIGS. 3A, B and C schematically illustrate various stages of the feed of waste material in the apparatus of FIG. 1.
Figure 3B:
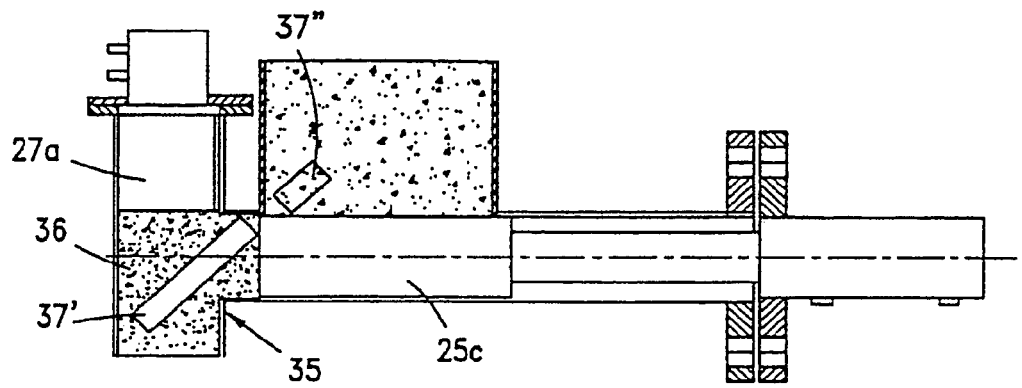
Figure 3C:
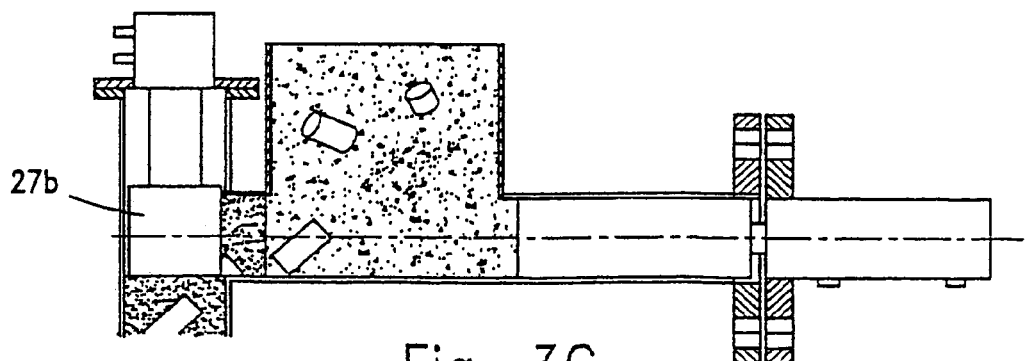

FIGS. 3A, B and C also illustrates what happens to any solid pieces of waste, such as that indicated at 37. Said piece it is discharged from hopper 23 into conduit 24 (see FIG. 3A). When piston 25 advances to position 25c, it may cut said piece into two fragments 37' and 37", one of which (37') becomes part of stopper 36 and proceeds to the reaction chamber, while the other fragments (37") is pushed back into hopper 23, and may be further fragmented in successive strokes of piston 25.

The operation of the device requires synchronization between the pistons 25 and 27, as illustrated in FIGS. 3A, B and C. For clarity's sake, the stroke of piston 25 from position 25b to position 25c, towards conduit 26, will be called the forward stroke, and its opposite stroke will be called the rearward stroke; and the stroke of piston 27 from position 27a to position 27b, towards reaction chamber 22, will be called the forward stroke, and its opposite stroke will be called the rearward stroke. When piston 25 is withdrawn away from the junction 35 of conduits 24 and 26, hopper 23 can discharge its contents into conduit 24. Concurrently piston 27 can advance to its position closest to reaction chamber 22 and drive the stopper, which has been previously formed at junction 35, towards said reaction chamber. Thereafter piston 27 will effect its rearward stroke and leave junction 35 free to receive the waste and concurrently piston 25 will effect its forward stroke, drive more waste to junction 35 and compress it there to form a new ash. Briefly it may be said that the synchronization is such that when one of the piston effects its forward stroke, the other piston effects its rearward stroke, and vice versa.

It will be clear that, though the pistons have an alternating motion and the waste is fed by portions, each portion being what was called a "stopper", the operation of the apparatus is continuous for all practical purposes, as the portions can be made small enough and the frequency of the piston motion high enough, so that no overall discontinuity is felt. Additionally, as has been said, pistons 25 and 27, and similarly pistons 25 and 41 or 52 and 54, can fragment and/or cut off parts which can disturb the movement of the waste in the apparatus, viz., it may be said, can act as guillotines. In this sense the method and apparatus of the invention are said to be continuous. Of course, they could be made absolutely continuous by using other waste driving apparatus, e.g. of the screw extruder type, and skilled persons could easily substitute such apparatus for the one of the described embodiment.

It will be understood that the waste does not progress freely in a downwardly direction because of its weight. It is continuously driven by incoming waste and remains substantially compacted. The reaction chamber tapers towards the bottom, in frusto-conical shape, as seen in FIGS. 1 and 4, and this taper is such that the waste and the carbon-containing solid residues produced by thermolysis remain compact.

Figure 4:
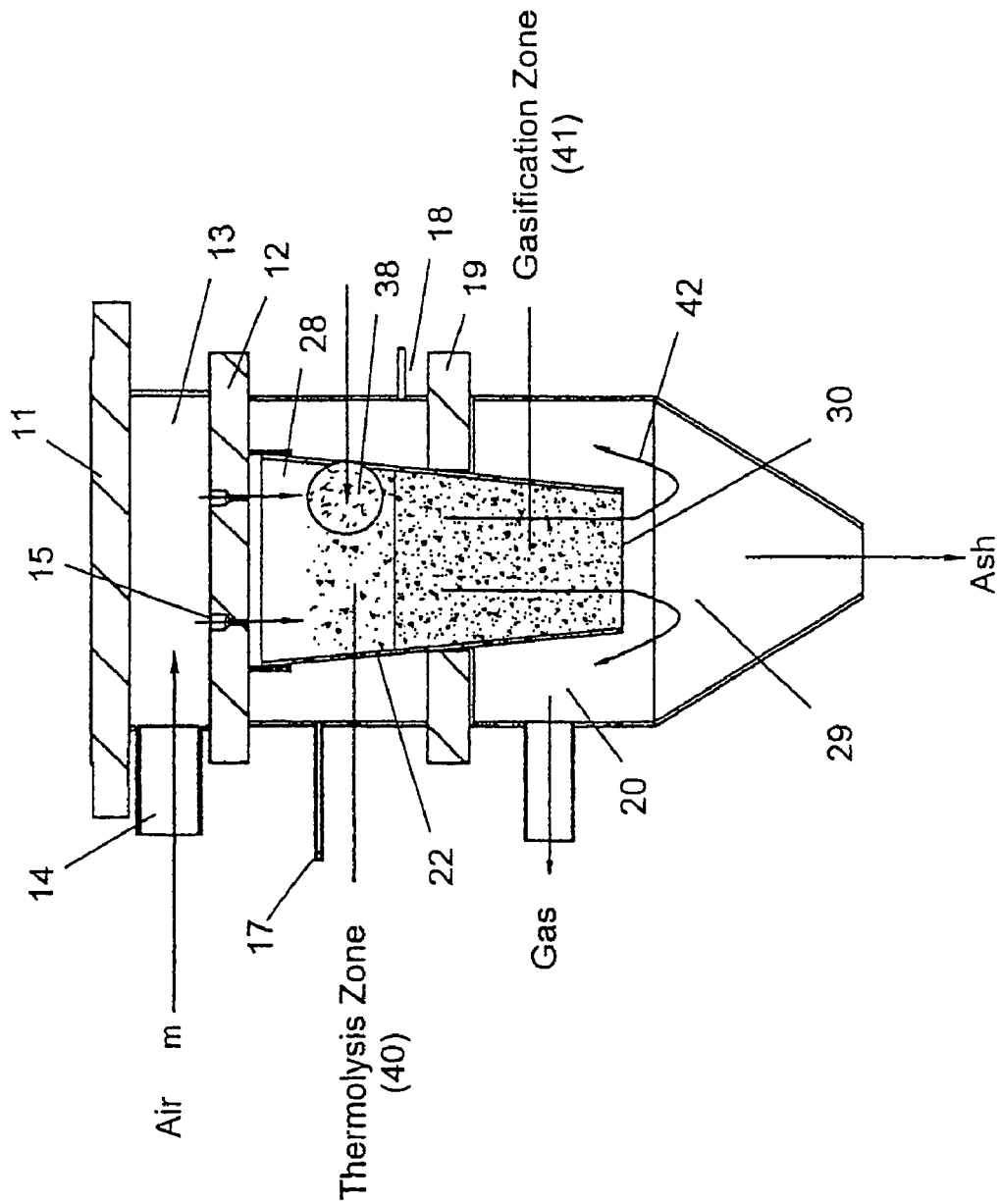
FIG. 4 is a schematic cross-section at an enlarged scale of the thermolysis and gasification portion of the apparatus of FIG. 1 better illustrating its operation.

The thermal treatment of the waste is better illustrated in FIG. 4. The upper part of the reaction chamber 22 is a thermolysis zone 40 and the lower part is a gasification zone 41. The two zones are not physically separated and their borderline, indicated in broken line in FIG. 4, may shift as the apparatus operates. The solid waste 38 enters the thermolysis zone from opening 28 of conduit 26. Air is fed from the top, through conduit 14, into a space between plates 11 and 12 and flows through openings 15 into the thermolysis zone. It then flows downwards through the waste and reacts with it, forming the fuel gases that are the final product and that flow out through outlet 21.

The reaction chamber 22 has a lowermost portion 29 which tapers from top to bottom and is preferably frusto-conically shaped, as seen in FIGS. 1 to 7. The lower opening 30 of reaction chamber 22 is located slightly above said portion 29. The ash formed in the gasification chamber is discharged into said portion 29 and from there into a conduit 31 I(see FIG. 2). Said conduit 31 is coupled with a piston 32 which drives the ash towards an outlet 33.

Figure 5:
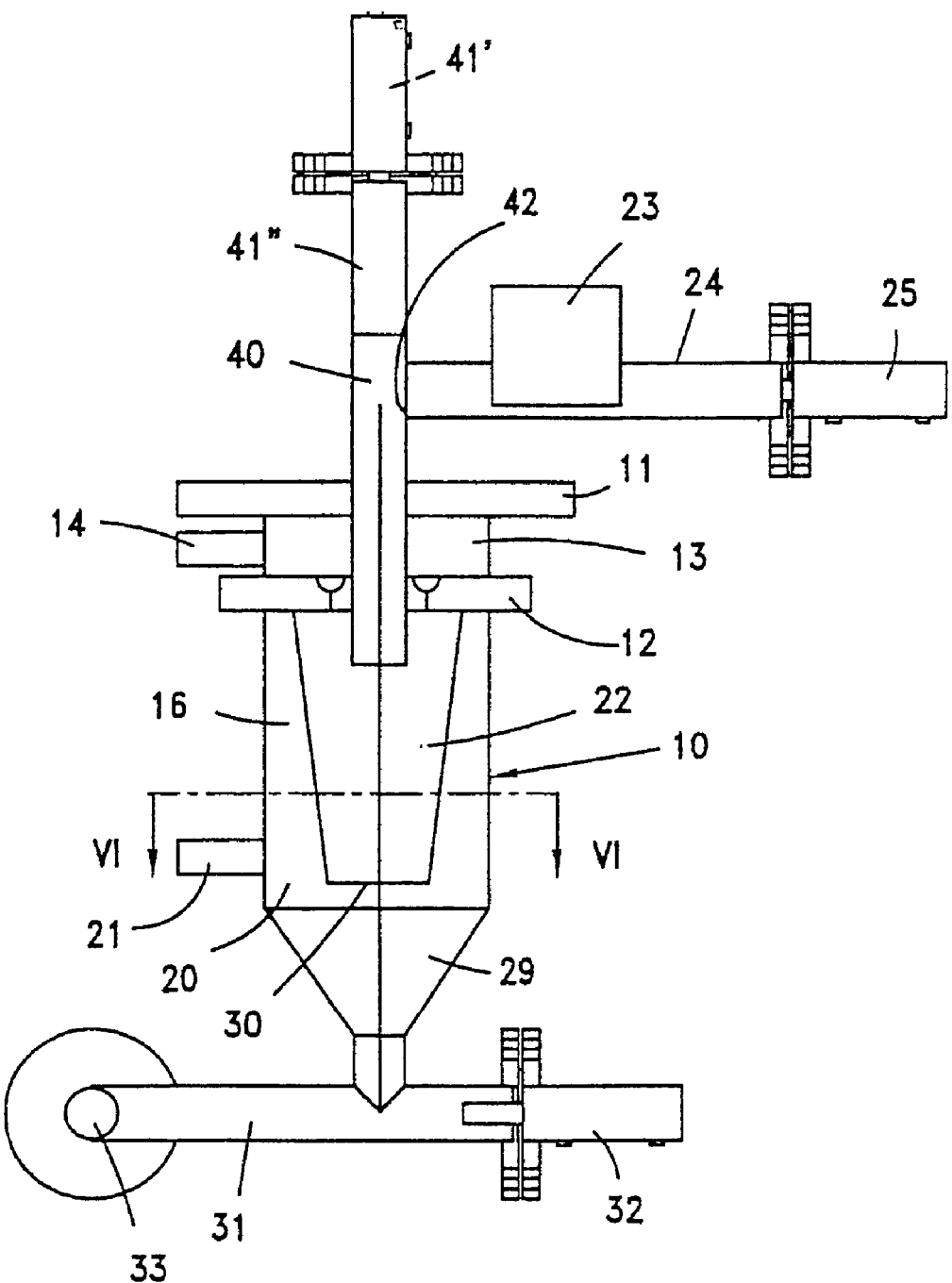
FIG. 5 is a schematic vertical cross-section similar to FIG. 1, but illustrating a second embodiment of the invention.
Figure 6:
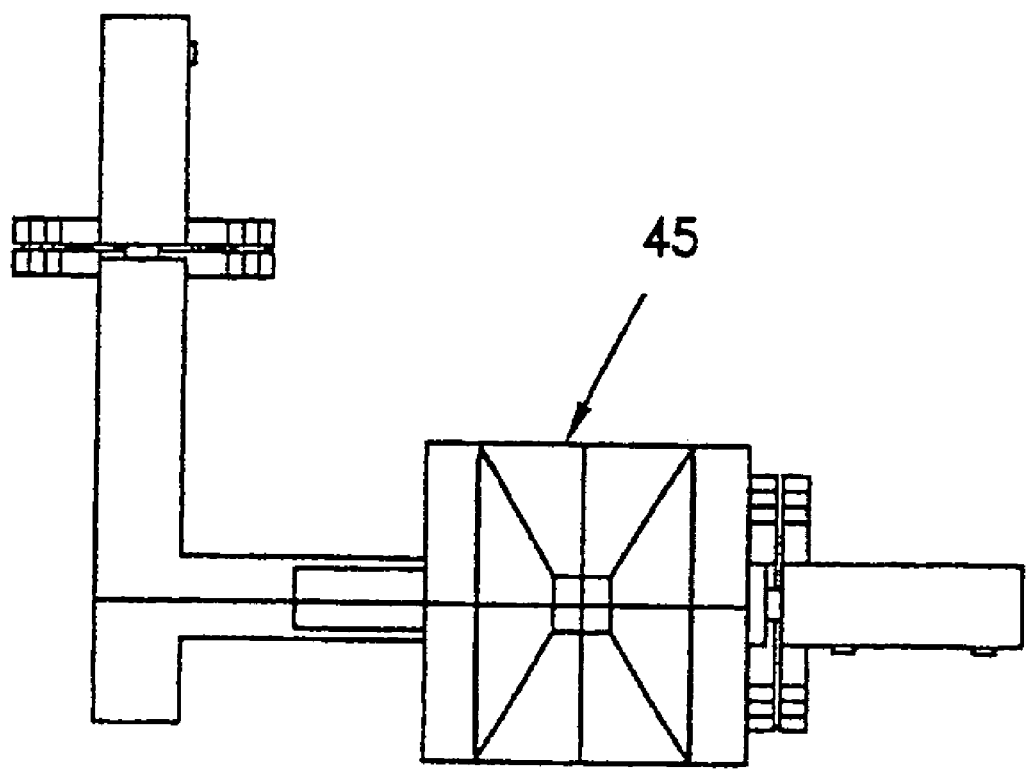
FIG. 6 is a schematic cross-section of the reaction chamber of FIG. 5 taken on plane VI—VI of FIG. 5.
Figure 7:
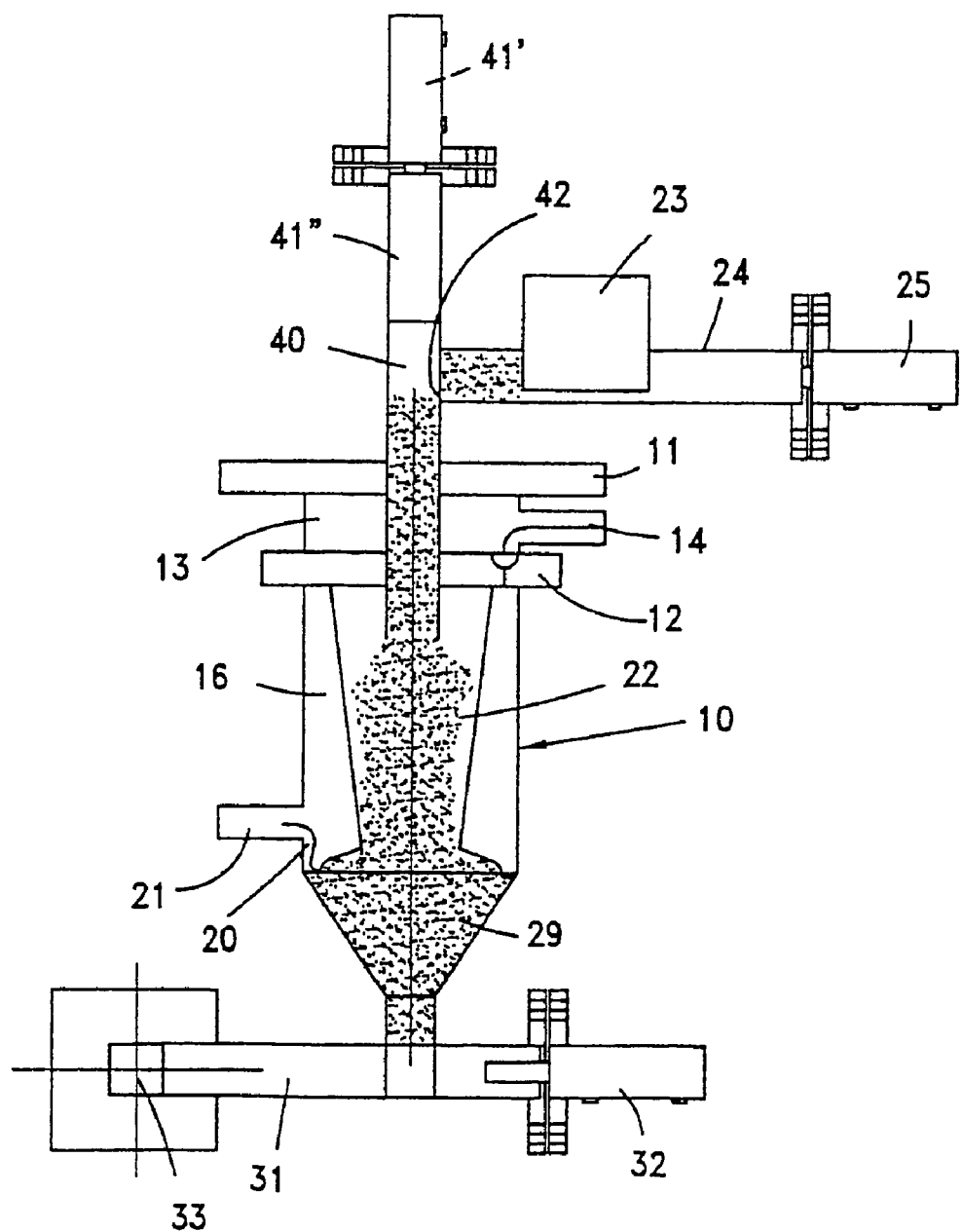
FIG. 7 illustrates the apparatus of FIGS. 5 and 6 in operation.

In FIGS. 5, 6 and 7 the parts that are identical or similar to parts of FIGS. 1 to 4 are indicated by the same numerals. The embodiment of FIGS. 5, 6 and 7 firstly differs from the previously described embodiment in that a pipe 40, corresponding in its function to pipe 26 of FIG. 2, is positioned vertically, viz. a vertical plane and substantially perpendicular to feed pipe 24 and passes through a central opening of plate 12. A piston 41 which has the same function as piston 25 of FIG. 2 is actuated within pipe 40 between an upper position 41' (indicated in broken lines) and a lower position 41". A stopper of waste forms at the junction 42 of pipes 24 and 40, for the same reason and in the same way as it was formed at the junction 35 in the previous embodiment.

The embodiment of FIGS. 5 to 7 also differs from that of FIGS. 1 to 4 in that the reaction chamber, generally indicated at 45, has a rectangular cross-section, as shown in FIG. 6.

Figure 8:
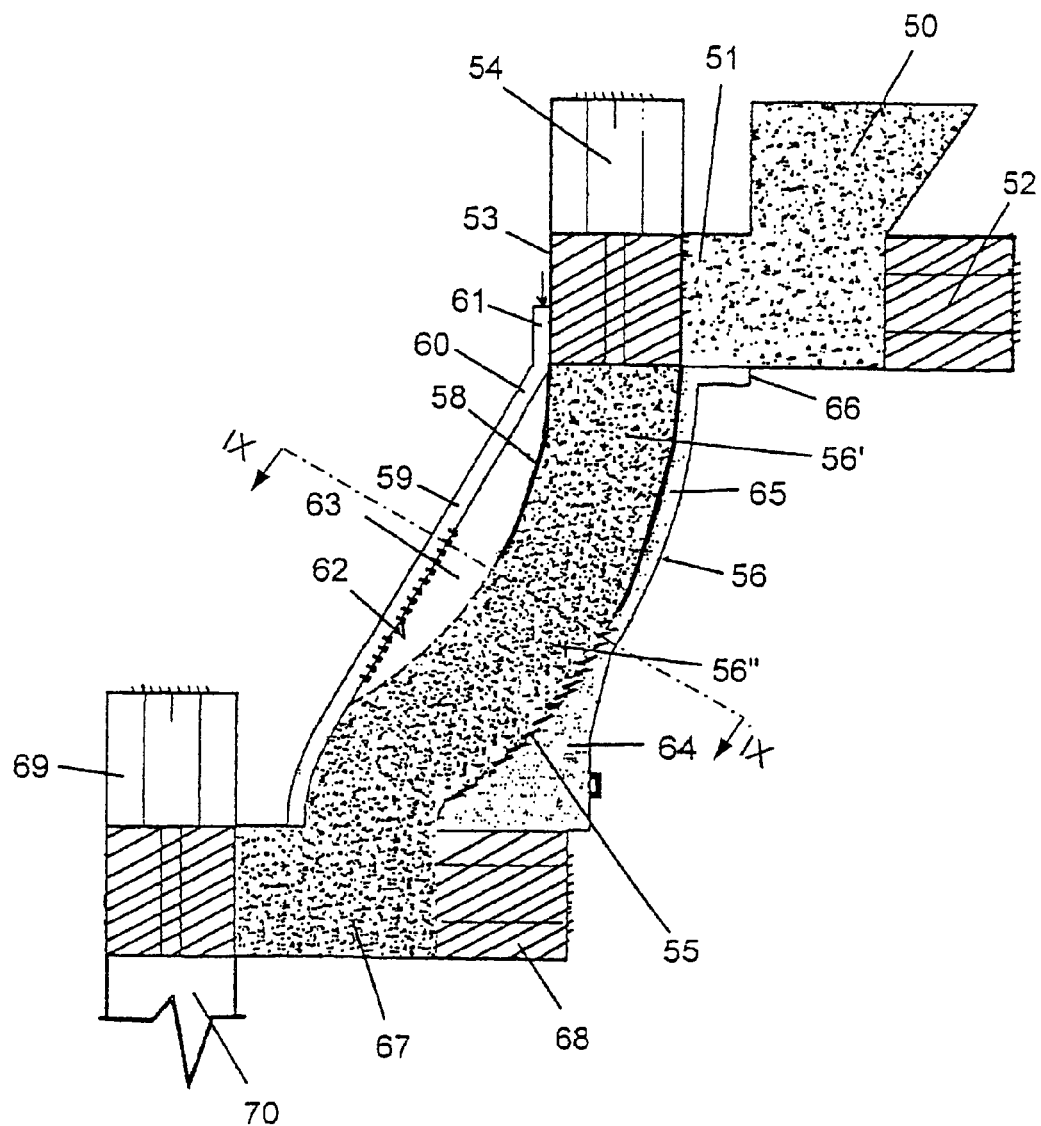
FIG. 8 is a partial vertical cross-section of an apparatus according to a third embodiment of the invention.
Figure 9:
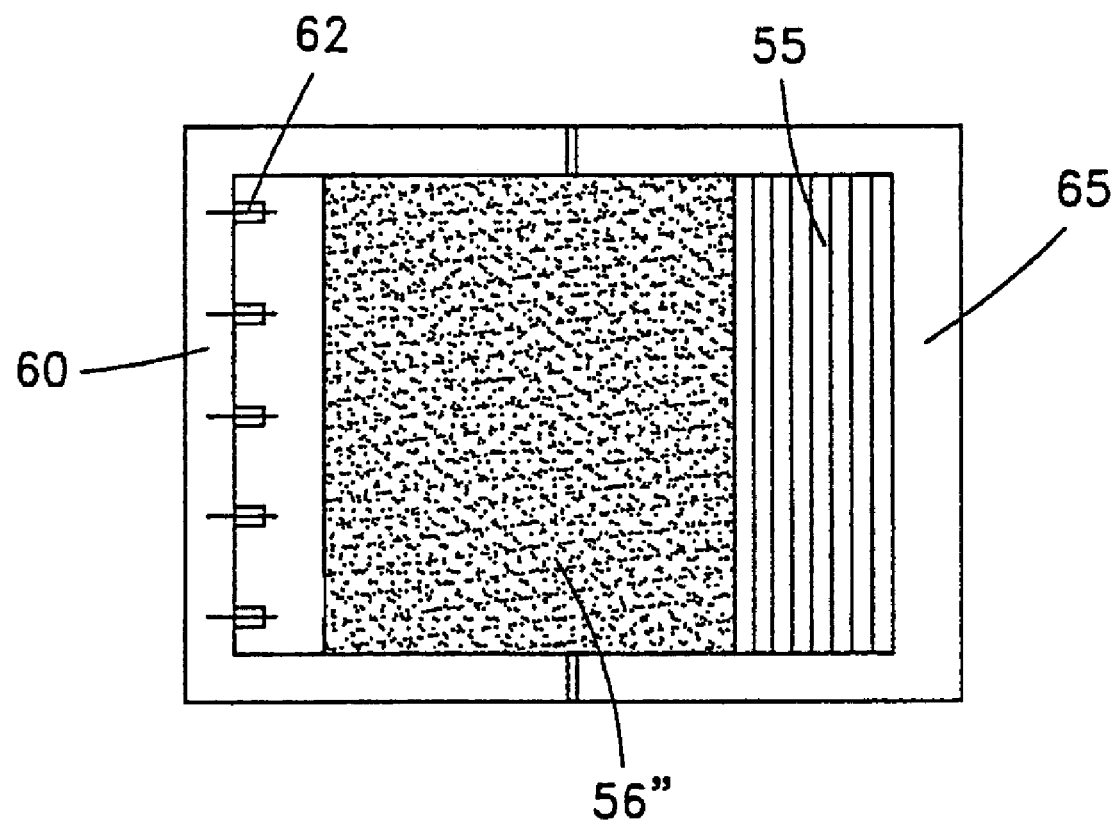
FIG. 9 is a schematic cross-section of the reaction chamber of FIG. 8 taken on plane IX—IX looking in the direction of the arrows.

In the embodiment of FIGS. 8 and 9, the feed of the waste occurs through hopper 50 and pipe 51 (said hopper and pipe actually merge into a single structure) and piston 52. The waste is fed to a pipe 53 in which is displaceable a piston 54.

The piston 52 compacts the waste when this comes into contact with the wall of pipe 53 and forms a stopper. Piston 54 is vertically displaceable and in its downward stroke, pushes the stopper of waste into the reaction chamber which is generally indicated at 56. In FIG. 8, piston 54 is shown in its lowermost position and there is no waste in pipe 53, while the hopper has been refilled of waste. The functional relationship between piston 52 and piston 54 is the same as that between piston 25 and piston 27 in the embodiment of FIGS. 1 to 4. So far, the present embodiment does not differ substantially from the embodiment of FIGS. 5 to 7. In this embodiment the reaction chamber 56 is curved. Its axis is preferably an arc of circle, having a radius that depends on the properties of the waste treated and on the capacity of the apparatus. For example, for a waste gasification apparatus with the cacapcity of 0.6 ton/hr, the radius is in the range 2.1 to 2.8 meters. and subtending an arc of approximately 60 degrees. The reaction chamber has an upper section 56' which is circumferentially limited by wall 58 having a circular cross-section and which extends to about one-half of the longitudinal, arcuate development of the reaction chamber. Below the wall 58, the reaction chamber has a lower section 56", which is uncovered at its concave side, while at its convex side it is limited by a wall having perforations 55. The perforated wall covers from 27 to 33 degrees. The sections 56' and 56" of the reaction chamber are not physically separated and the passage from the one to the other changes with variations in the process parameters and, in each case, with time, so that it is not possible to mark a separating line in FIG. 8. An air conduit 60 surrounds the reaction chamber on its concave side and has the same cross-sectional, angular development as the uncovered portion of the reaction chamber section 56". It receives air from opening 61, at any suitable pressure, and the air is ejected through perforations 62, so as to form between the conduit 60 and the reaction chamber an air chamber 63. On the convex side of the reaction chamber, a gas settling chamber 64 is formed, which tapers into a gas conduit 65 terminating in a gas outlet 66, from which issue the fuel gases produced, which are then collected and utilized in any convenient manner, not illustrated. At the lowermost portion of the reaction chamber, the spent waste accumulates into a conduit 67. A piston 68 pushes the spent waste into said conduit, from which it is ejected by a piston 69 into discharge 70, shown as broken off. The discharge of the spent waste or ash is essentially the same as in the previous embodiments and can be designed in the best way by persons skilled in the art.

In this embodiment, the waste stopper which is formed in pipe 53 and is pushed by piston 54 into the reaction chamber is heated, or better, pre-heated, in the upper section 56' of the reaction chamber, viz. the section of the reaction chamber which is provided with a tubular casing. Since that section of the reaction chamber is in contact with the gas outlet conduit on one side and on the other side with the air chamber 63 in which air is generally introduced at a temperature well above room temperature, e.g., about 100° C., the waste becomes heated and thermolysis begins even though no air is fed into that section of the reaction chamber. Therefore, even before air comes into contact with the waste, it begins to undergo a thermolysis process. When it comes into contact with the air, fed through the openings 62, the thermolysis of course increases, and is completed in the layer of the waste that is close to the air feed openings, the thickness, shape and borders of which layer are variable. The air issuing from openings 62 passes through the waste in a cross-sectional direction, forms partial combustion gases in the thermolysis zone and then completes the gasification in the gasification zone, which is the portion of the reaction chamber section 56" that is interposed between the thermolysis zone and the orifices 55, from which issue the fuel gases produced. The separation between the thermolysis and the gasifications zones is not fixed and can vary with variations of the process parameters and with the passage of time and therefore could not be marked in FIG. 8. The fuel gases therefore issue from orifices 55 and from them flow through gas settling chamber 64, conduit 65 and outlet 66. The progress of the waste through the reaction chamber and the discharge of ashes occur smoothly and gradually.

It should be understood that in an apparatus according to the invention, if the reaction chamber is vertical, there should be some restriction in it or some way of creating a resistance to the flow of the waste. In the preceding embodiments that resistance is created by the lower conical portion of the reaction chamber. In the embodiment of FIG. 8 it is created by the very shape of the reaction chamber. It could have been thought that in such a reaction chamber the waste would spill out on the uncovered part of the concave side and fill the space that is presently an air chamber 63 and occlude the orifices 62. It is surprising that this is not so. The initial heating in zone 56' of the reaction chamber has imparted to the waste a certain compactness, so that the waste remains more or less in the shape indicated in the drawing. On the concave side of the reaction chamber the waste may roll upon itself to some extent, forming a kind of superficial vortices, but it remains essentially in it general, regular shape and the formation of such vortices is only an advantage because it improves the contact of the air with the waste. The waste would not drop downwards by itself and if not subject to impulses from the piston (which is piston number 54 in FIG. 8), would remain unmoving. It is the combined and synchronized action of the various pistons that provides the smooth and substantially continuous motion of the waste and of the ashes and renders the apparatus extremely efficient and productive.

The reaction chamber has been described as having an axis that is an arc of circle. It should be understood that, while this is the preferred shape, it is not an exclusive one, and the shape, curvature radius and other geometrical parameters of the reaction zone may be changed by skilled persons if desired to obtain a smooth progress of the treated waste. Generally, it is preferred the axis of the chamber should be tangent to the vertical at its top and should subtend an arc close to 45 degrees at its bottom, viz. at the level at which the gas outlet orifices terminate, but these geometrical features are not compulsory and can be adjusted by skilled persons to obtain optimal progress of the waste.

It will be clear that, though the pistons have an alternating motion and the waste is fed by portions, each portion being what was called a "stopper", the operation of the apparatus is continuous for all practical purposes, as the portions can be made small enough and the frequency of the piston motion high enough, so that no overall discontinuity is felt. Additionally, as has been said, pistons 25 and 27 or 52 and 54 can fragment and/or cut off parts which can disturb the movement of the waste in the apparatus, viz., it may be said, can act as guillotines. In this sense the method and apparatus of the invention are said to be continuous. Of course, they could be made absolutely continuous by using other waste driving apparatus, e.g. of the screw extruder type, and skilled persons could easily substitute such apparatus for the one of the described embodiment.

In an example of application of the invention, an industrial apparatus was built having dimensions 2×2×3 meters and heat output 1.0 MW. The apparatus had a capacity of 1 ton/hr of waste, consisting of 35 wt % of combustible materials, 50 wt % of humidity and 15 wt % of incombustible materials. It produced a gas output of 2000 m³/hr, with a residue of 300 kg/hr.

While embodiments of the invention have been described by way of illustration, it will be understood that the invention may be carried out with many modifications, variations and adaptations, without departing from its spirit or exceeding the scope of the claims.

The invention claimed is:

1. Method of continuous treatment of domestic waste, which comprises:
   a) providing a reaction space;
   b) feeding the waste to be treated to said reaction space at a controlled rate;
   c) concurrently compacting said waste to form a stopper preventing leakage of gases from said reaction space;
   d) feeding an oxygen-containing gas to said reaction space, whereby to affect the combustion of said waste and produce gases and solid material;
   e) controlling the temperature in the reaction space by activating means for controlling the temperature of said oxygen-containing gas;
   f) causing said oxygen-containing gas to pass through said solid material, thereby causing said oxygen-containing gas to react with said solid material, whereby to produce fuel gases and ash;
   wherein, the composition and quality of said fuel gases are controlled by determining the desired equilibrium constant of the reaction of said oxygen-containing gas with said solid material and maintaining said desired equilibrium constant by controlling the temperature in the reaction space and the ratio of the waste to the oxygen-containing gas, which ratio is controlled by controlling the rates of feeding said waste and said oxygen-containing gas to said reaction space; and
   wherein, the feeding of the waste is done by providing two conduits, each comprising a piston at its end and disposed at right angles to each other and operating said pistons in a synchronized manner in which one of said pistons to carries out the forward stroke when the other of said pistons carries out its rearward stroke and vice versa, thereby allowing continuous operation of said apparatus.

2. Method according to claim 1, wherein the reaction space includes a thermolysis zone and a gasification zone and the oxygen-containing gas is fed to said thermolysis zone.

3. Method according to claim 2, wherein the thermolysis zone is superimposed to the gasification zone.

4. Method according to claim 2, wherein the reaction chamber has an arcuate shape and said the thermolysis zone is located at the concavity of said arcuate shape.

5. Method according to claim 1, wherein the oxygen-containing gas is air.

6. Method according to claim 1, wherein the fuels gases comprise carbon monoxide and hydrogen.

7. Method according to claim 1, comprising advancing the waste through the reaction space in the form of an elongated mass, feeding oxygen containing gas to one side of said elongated mass and withdrawing fuel gases from the other side of said elongated mass.

8. Method according to claim 1, wherein the oxygen containing gas is fed at high temperature and under pressure.

9. Apparatus for the continuous treatment of domestic waste, which is unsorted by size, said apparatus comprising:

(a) a reaction chamber;
(b) means for feeding an oxygen-containing gas to said reaction chamber;
(c) means for controlling the temperature of said oxygen-containing gas;
(d) means for controlling the composition of said oxygen-containing gas;
(e) a gas receiving space for receiving the gases produced in the gasification zone of said reaction chamber, provided with an outlet for said gases;
(f) means for discharging the ash formed at the bottom of said reaction chamber;
(g) a first conduit comprising a first piston at its end furthest from said reaction chamber;
(h) a second conduit disposed at right angles to said first conduit such that a junction is formed at the intersection of said first conduit with said second conduit, said second conduit comprises a second piston at its first end and has its second end located within said reaction chamber;
(i) means for synchronizing the motion of said first and said second pistons; and
(j) a hopper, into which the waste to be processed is loaded and from which said waste is discharged into said first conduit;
wherein, said first and said second pistons fragment and/or cut off parts which can disturb the movement of the waste in the apparatus and said synchronizing means comprise means for causing one of said pistons to carry out the forward stroke when the other of said pistons carries out its rearward stroke and vice versa, thereby allowing continuous operation of said apparatus.

10. Apparatus according to claim 9, wherein the air chamber is situated above the reaction chamber.

11. Apparatus according to claim 9, wherein the air chamber is situated on one side of the reaction chamber.

12. Apparatus according to claim 9, wherein both waste conduits are horizontal.

13. Apparatus according to claim 9, wherein one of the waste conduits is horizontal and the other is vertical.

14. Apparatus according to claim 9, further comprising or associated with means for feeding oxygen-containing gas under pressure to the reaction chamber.

15. Apparatus according to claim 9, wherein the means for discharging the ash comprise a piston, a conduit for the ash advanced by the piston, and an outlet.

16. Apparatus according to claim 9, wherein the means for discharging the ash comprise:
   (a) a first conduit comprising a first piston;
   (b) a second conduit disposed at right angles to said first conduit such that a junction is formed at the intersection of said first conduit with said second conduit, said second conduit comprising a second piston at its first end and having an outlet located at its second end; and
   (c) means for synchronizing the motion of said first and said second pistons;
wherein, said synchronizing means comprise means for causing one of said pistons to carry out the forward stroke when the other of said pistons carries out its rearward stroke and vice versa, thereby allowing continuous discharging of ash from said apparatus.

17. Apparatus according to claim 9, wherein the reaction chamber is elongated and curved, having its concavity directed towards the oxygen-containing gas feed means and having its convexity directed towards the gas receiving space.

* * * * *